US012393807B2

(12) United States Patent
Callegari et al.

(10) Patent No.: US 12,393,807 B2
(45) Date of Patent: Aug. 19, 2025

(54) METHOD FOR MARKING LIGHTING DEVICES, AND CORRESPONDING DEVICE

(71) Applicant: Clay Paky S.r.l., Seriate Bergamo (IT)

(72) Inventors: Massimo Callegari, Seriate Bergamo (IT); Andrea Morra, Padua (IT); Giorgio Masserdotti, Brignano Gera d'Adda Bergamo (IT)

(73) Assignee: Clay Paky S.r.l., Seriate Bergamo (IT)

( * ) Notice: Subject to any disclaimer, the term of this patent is extended or adjusted under 35 U.S.C. 154(b) by 0 days.

(21) Appl. No.: 18/715,215

(22) PCT Filed: Oct. 10, 2022

(86) PCT No.: PCT/IB2022/059695
§ 371 (c)(1),
(2) Date: May 31, 2024

(87) PCT Pub. No.: WO2023/105310
PCT Pub. Date: Jun. 15, 2023

(65) Prior Publication Data
US 2025/0036899 A1 Jan. 30, 2025

(30) Foreign Application Priority Data
Dec. 6, 2021 (IT) .................. 102021000030773

(51) Int. Cl.
*G06K 7/14* (2006.01)
*F21V 21/30* (2006.01)
(Continued)

(52) U.S. Cl.
CPC ............ *G06K 7/1417* (2013.01); *F21V 21/30* (2013.01); *F21V 23/003* (2013.01); *F21W 2131/406* (2013.01)

(58) Field of Classification Search
CPC ..... G06K 7/1417; F21V 21/30; F21V 23/003; F21W 2131/406
See application file for complete search history.

(56) References Cited

U.S. PATENT DOCUMENTS 7,771,247 B2 * 8/2010 Kessler .................. A63H 1/24
446/236
9,736,541 B1    8/2017 Nijim et al.
(Continued)

FOREIGN PATENT DOCUMENTS

EP    3671678 A1    6/2020
KR    20200068532 A *  6/2020
WO    2018078773 A1   5/2018

OTHER PUBLICATIONS

International Search Report and Written Opinion dated Jan. 12, 2023. 14 pages.

*Primary Examiner* — Laura A Gudorf
(74) *Attorney, Agent, or Firm* — RMCK Law Group PLC

(57) ABSTRACT

A lighting device that can be used, for example, in the show-business and entertainment sector includes an electrically powered light generator, as well as electrical circuitry configured to produce electrical signals for driving the light generator. The electrical circuitry has stored within it an electrical marker signal uniquely associated to the lighting device, and a visual display unit is coupled to the electrical circuitry, where the visual display unit is configured to display the electrical marker signal as a visually recognizable optical mark, such as a QR code.

11 Claims, 2 Drawing Sheets

(51) Int. Cl.
*F21V 23/00* (2015.01)
*F21W 131/406* (2006.01)

(56) References Cited

U.S. PATENT DOCUMENTS

| | | |
|---|---|---|
| 10,638,571 B2 | 4/2020 | Brand et al. |
| 2004/0017164 A1 | 1/2004 | Belliveau et al. |
| 2015/0267882 A1* | 9/2015 | O'Brien ............. F21V 23/0442 |
| | | 362/183 |

* cited by examiner

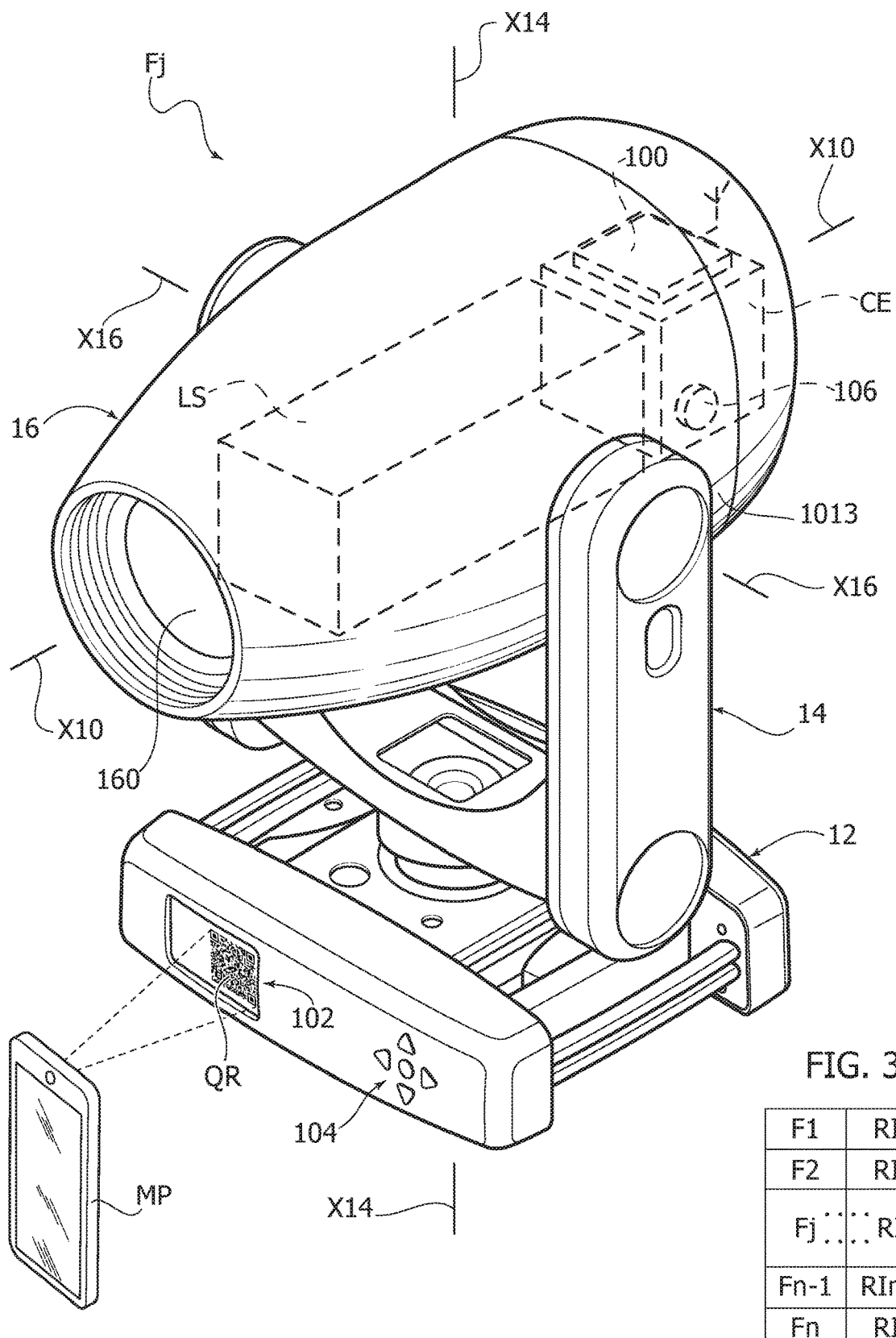

METHOD FOR MARKING LIGHTING DEVICES, AND CORRESPONDING DEVICE

CROSS-REFERENCE TO RELATED APPLICATIONS

This application is a 371 National Stage of International Application No. PCT/IB2022/059695, filed Oct. 10, 2022, which claims priority to Italian Patent Application No. 102021000030773 filed Dec. 6, 2021. The disclosure of each of the above applications is incorporated herein by reference in its entirety.

TECHNICAL FIELD

The present disclosure relates to lighting devices.

One or more embodiments may be used, for example, in the show-business and entertainment sector.

TECHNOLOGICAL BACKGROUND

Lighting devices that are able to emit light radiation of high intensity find application in sectors, such as the show-business and entertainment sector.

This may be the case, for example, of the products commercially available from the present applicant Clay Paky under the brand name AXCOR (see, for example, claypaky.it).

The modalities of use of such lighting devices frequently entail carrying and, in general, handling thereof with the need to take into account various factors.

For instance, the above devices may be used for lighting of stages that are each time set up even for single events (consider, for example, concerts hosted in stadiums and arenas in the course of tours) and thus frequently need to be carried/handled.

Also in sectors other than the show-business and entertainment sector, mentioned herein purely by way of example, there may on the other hand arise the need to apply a marking on devices of this nature, i.e., characteristic information regarding (i.e., uniquely linked to) the individual device: for example, a serial number, a unique identifier (UID), and a production lot.

The document U.S. Pat. No. 9,736,541 B1 describes a solution developed with particular attention paid to the possible application in the sector of set-top boxes (STBs). The solution envisages processing a visual code that can be used for functions of navigation, control, and/or other commands.

The document U.S. Pat. No. 10,638,571 B2 (to which EP 0 041 321 B1 corresponds) describes a method for marking lighting devices, in particular street lighting devices, in a network that can be controlled via a server. Each device is equipped, in its operating state, with a mark, in practice a label, such as a QR code visually recognizable and usable for identifying the lighting device.

As will be seen in what follows, these solutions are not without various drawbacks, above all (but not only) in view of a possible application in the show-business and entertainment sector.

OBJECT AND SUMMARY

The object of one or more embodiments is to provide a lighting device that will be able to overcome the drawbacks outlined previously.

According to one or more embodiments, the above object can be achieved thanks to a method having the characteristics recalled in the ensuing claims.

One or more embodiments regard a lighting device usable according to the above method.

The claims form an integral part of the technical teachings provided herein with reference to the embodiments.

BRIEF DESCRIPTION OF THE DRAWINGS

One or more embodiments will now be described, purely by way of non-limiting example, with reference to the annexed drawings, wherein:

FIG. 2 is an overall view of a lighting device according to some embodiments; and FIG. 3 illustrates the possible layout of a data file that can be produced according to some embodiments.

It will be appreciated that, for clarity and simplicity of illustration, the various figures may not be reproduced in the same scale.

DETAILED DESCRIPTION

In the ensuing description, various specific details are illustrated in order to enable an in-depth understanding of various examples of embodiments according to the disclosure. The embodiments may be obtained without one or more of the specific details, or with other methods, components, materials, etc. In other cases, known structures, materials, or operations are not illustrated or described in detail so that the various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Consequently, phrases such as "in an embodiment" or "in one embodiment" that may be present in various points of this description do not necessarily refer exactly to one and the same embodiment. Moreover, particular conformations, structures, or characteristics may be combined in any adequate way in one or more embodiments.

The references used herein are provided merely for convenience and hence do not define the sphere of protection or the scope of the embodiments.

Once again for brevity and simplicity of treatment, and unless the context were to indicate otherwise, in the annexed figures parts or elements that are similar or identical are designated by the same references, without repeating the corresponding description for each figure.

Figure 1:
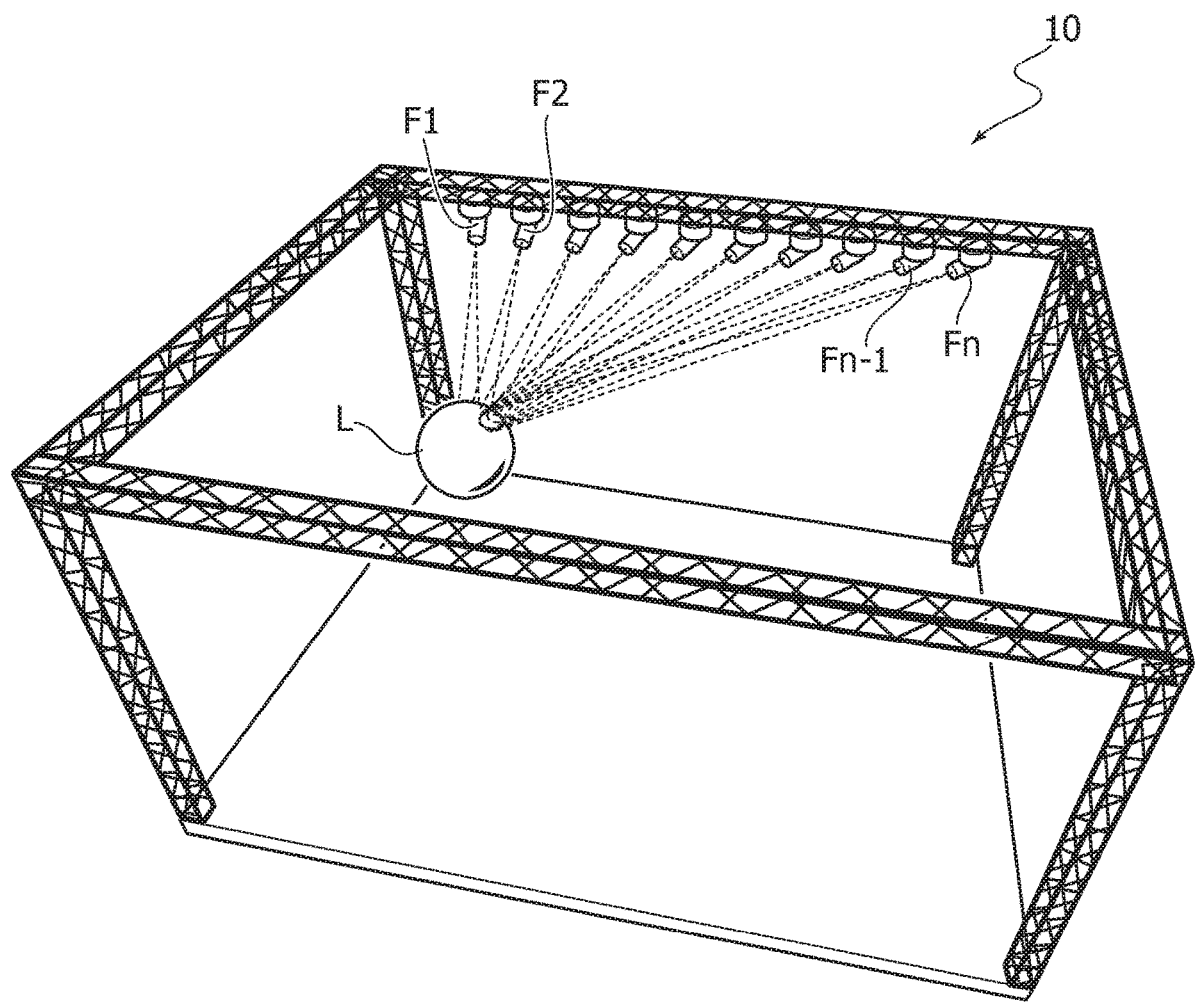
FIG. 1 illustrates a lighting system where embodiments as described herein can find application.
Figure 1:
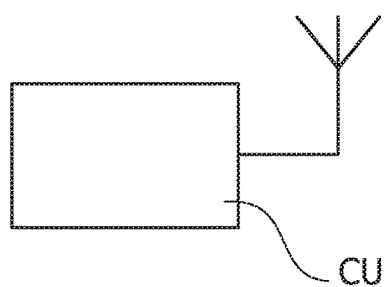

In FIG. 1, the reference 10 designates as a whole a lighting system that can be used, for instance, in the show-business and entertainment sector.

It may, for example, be a lighting system comprising a plurality of lighting devices F1, F2, . . . , Fn−1, Fn mounted on a supporting structure for lighting one or more elements L (for example, people and/or objects) that are located on a lit-up scene (for example, singers, musicians, and corresponding instruments).

Lighting systems of this nature are designed to operate in a dynamic way, providing a wide range of lighting effects such as to involve both the orientation of the lighting beams (which move in space) and the mode of emission of the beams (turning-on, turning-off, variation of colour, stroboscopic effects, etc.)

This may occur under the control of a control unit (or console) CU, capable of sending to the lighting devices F1, F2, . . . , Fn−1, Fn (for example, in wireless mode) respective control signals for implementing a light management that is outlined by a light designer and can be stored in the control unit CU in view of its implementation throughout the duration of the show.

In this context, it is possible to benefit from the characteristics of systems of a DMX (Digital MultipleX) type or, more precisely of a DMX512 type, which is a well-known standard used for controlling stage lighting in the show-business sector, for example at an RDM level, (Remote Device Management) RDM being a communication protocol based upon DMX for bidirectional communication between a light console, such as the control unit CU, and a lighting source.

In summary, a lighting system like the system 10 of FIG. 1 comprises a certain number of lighting sources (or fixtures) F1, F2, . . . , Fn−1, Fn, the operating parameters of which (turning-on/turning-off, intensity of the lighting beam emitted, movements of pan & tilt, chromatic characteristics of the radiation emitted, etc.) can be controlled via the control unit or console CU.

Systems of this kind are known in the art in a wide variety of possible solutions of implementation, which renders it superfluous to provide a more detailed description herein.

FIG. 2 illustrates a possible embodiment of a lighting device F1, F2, . . . , Fn−1, Fn that may be used in a lighting system 10, as illustrated in FIG. 1.

According to a possible configuration (in itself known), the device, denoted as a whole by Fj, comprises a base 12 for enabling mounting thereof on a supporting structure (it may, for example, be a stage structure in a theatre, an arena, or on the site of a show-business event, as exemplified in FIG. 1) on which a fork-like support 14 is mounted.

The fork-like support 14 is orientable, for example through 360°, about an axis X14 (which is vertical in the figures) and supports with its arms or prongs a mobile head 16 orientable with a general panning movement about an axis X16 (which is horizontal in figures).

Mounted in the head 16 is a light source LS (for example, a laser-diode RGB light source), which is to produce a lighting beam that exits from the head 16 through a front optics 160, in a direction substantially aligned with a longitudinal axis of the mobile head, designated by X10.

The combined movement about the axes X14 and X16, governed via motor-drives (not visible in the figures) arranged, for example, in the base 12 and in the fork-like support 14 (i.e., in the head 16) leads the lighting beam projected through the front optics 160 to perform a scanning movement that is able to cover a volume greater than a half-space.

With the exception of what is recalled in greater detail in what follows, the overall structure of a device Fj and the modalities of performance of the aforesaid scanning movement must be deemed known in the art, which renders it superfluous to provide more detailed indications in the framework of the present description.

As represented, once again with a dashed line, in FIG. 1, the light source LS is driven by electrical circuitry CE (comprising, for example, a digital-signal processor—DSP—and associated power circuits) configured, in a way in itself known, for driving the source LS as a function of control signals sent, for example in wireless mode, by the control unit CU.

In general, it is desirable for the commands sent by the control unit CU to the individual lighting devices F1, F2, . . . , Fj, . . . , Fn−1, Fn to have the possibility of being different from one another.

In this way, each individual device Fj can be governed according to modalities of its own, virtually envisaging different modalities for each lighting device F1, F2, . . . , Fj, . . . , Fn−1, Fn.

This result is evidently facilitated by the fact that the control unit CU knows the characteristics (and location) of the lighting devices F1, F2, . . . , Fj, . . . , Fn−1, Fn, this to prevent, just to provide an example, the unit CU from sending to a certain device Fj a command that the device is not in a condition to implement, for example in so far as the device is of a model not prearranged for performing particular lighting function.

Hence the need to conduct rapidly and in a reliable way a "census" of the devices F1, F2, . . . , Fj, . . . , Fn−1, Fn, identifying characteristics thereof, such as serial number, the unique identifier (UID), the production lot, etc.

This marking operation may prove anything but easy to carry out.

This applies, in particular, to the show-business and entertainment sector: a system 10 as illustrated in FIG. 1 may in fact comprise even hundreds of devices F1, F2, . . . , Fj, . . . , Fn−1, Fn, mounted, frequently in not easily accessible conditions, in an installation that is to be rendered operative in short times, may be in view of use thereof for a single event.

The above in conditions where it is far from easy and convenient to access rapidly the aforesaid characteristic information (for example, serial number, identifier UID, production lot, etc.) linked in a unique way to each individual device. On the other hand, this information is frequently carried by an (electrical) signal stored in the device itself, for example in a memory 100 comprised in the circuitry CE.

At least in principle, it would be thinkable to resort to the solution proposed in U.S. Pat. No. 10,638,578 B2 (to which EP 3 041 321 B1 corresponds), i.e., "labelling" the individual devices F1, F2, . . . , Fn−1, Fn with labels that bear QR codes that can be read optically, for example via a normal smartphone.

In the context considered herein (consider, for example, lighting systems, that are to be used in the context of tours and are hence installed and dismantled at each show, with the devices F1, F2, . . . , Fn−1, Fn continuously handled also for operations of packaging and transport) such a solution is exposed to various drawbacks.

A label degrades in fact over time, for example, since it risks getting scratched, until it becomes illegible and hence useless; this may also happen when the device is mounted on a truss with the label that ends up in a position poorly lit up and is hence difficult to read.

Moreover, an adhesive label may be removed (perhaps inadvertently) during handling of the device, which, as has been seen, may be a frequent event.

In some cases, certain information stored in an internal memory of the lighting device may prove inconvenient to display on a label or runs the risk of being read and reproduced incorrectly on a label.

In a complementary way, some information may be considered proprietary, so that it may not be desirable to be seen reproduced in an evident way on a label applied on the device.

Again, once a label is applied on the device, it cannot be easily updated in the case where some information changes format or meaning, unless the device that already is in the hands of the user is called back to the manufacturer to update the information or else unless updated labels are distributed.

Once again in principle, it would be thinkable to resort to a certain extent to the solution proposed in U.S. Pat. No. 9,736,541 B1, for example requiring that, upon switching-on, each device F1, F2, . . . , Fn−1, Fn should communicate its data to the control unit CU.

This solution implies recourse to specific communication protocols and may prove complex to implement: it may in fact require the control unit CU to have available preventive information on the position of installation of the devices F1, F2, . . . , Fn−1, Fn.

It will on the other hand be appreciated that the problems highlighted herein are to a major extent irrespective of the nature and meaning of the marking information (for example, serial number, UID, production lot, etc.) uniquely associated to the lighting device (Fj).

The examples considered herein tackle in fact the technical problem linked to the fact that, whatever its nature and meaning, this information may not be presented adequately on the outside of the device Fj, for example in so far as it is rendered illegible or has been removed from the device.

The examples considered herein exploit the fact that lighting devices like the device Fj of FIG. 2 can be equipped (or be already equipped, for different purposes) with a display 102, such as a liquid-crystal display (LCD) connected to the circuitry CE (hence to the memory 100) and mounted, for example, in the base 12 so as to be visible also when the device Fj is installed.

In this way, an electrical marker signal that carries marking data characteristic of the individual device Fj, such as serial number, UID, production lot, etc., for example as stored in the memory 100 can be presented on the display 102, for example as QR code, so that it can be easily read by any mobile device, such as a smartphone MP.

In this way, by reading the above code it is possible to generate a file as schematically represented in FIG. 3, i.e., a file in which, associated to each device Fj, j=1, 2, . . . , n−1, n is a corresponding information record RIj, j=1, 2, . . . , n−1, n, containing respective marking information, for example the serial number, the UID (e.g., UID: 4350-3C0587D0), etc.

The use that the reading device MP (for example, a smartphone) can make of the code read can hence be comprised in an extremely wide range, exploiting, in particular, the reliability of reproduction, and hence reading, of the code itself.

The solution proposed herein overcomes the drawbacks outlined previously.

In the first place, a display like the display 102 is rather robust in regard to wear. Even though it is subject to scratches, it is unlikely to become altogether illegible. This applies also in the case where it ends up in a position poorly lit up by ambient light, with the display that can be lit up in a usual way, even with various levels of brightness.

Once again, a display like the display 102 of FIG. 2 is hard to remove during handling of the device, without damaging the device in a serious and evident way, consequently in a manner that is easily detectable.

Albeit rather rich from the information standpoint, an electrical marker signal stored in an internal memory of the lighting device, such as the memory 100, lends itself to being presented on a display 102, possibly divided into a number of screenfuls that can be selected via navigation buttons 104.

All the foregoing is obtained avoiding the risk of incorrect reading or reproduction on a label.

By operating, in a usual way for various applications, the navigation buttons 104 it is also possible to cause information considered proprietary not to be displayed in a stable way, but to be presented on the display only in response to an explicit command.

The solution proposed herein is simple to implement, does not entail recourse to specific communication protocols, and most importantly it suited to gathering and supplying to the control unit CU information on the position of installation of the device F1, F2, . . . , Fn−1, Fn: for example, an operator can move along a truss, on which n devices F1, F2, . . . , Fn−1, Fn are mounted and reading the corresponding data from the displays 102 so as to be able to supply to the unit CU a file like that of FIG. 3, with the indication of the order of installation of the devices, along with the corresponding characteristics.

Display of the information on the display 102 does not require the device Fj to be turned on (i.e., with the source LS that emits light radiation), it being possible, instead, to use a buffer battery 106 associated to the circuitry CE for lighting up the display 102 for the time necessary to show a code (e.g., a QR code).

Furthermore, the display that appears on the display 102 may be automatically updated in the case where some marking information changes format or meaning as a result of an update (for example, of the memory 100) however implemented. Codes such as the QR code considered here are in fact generated by the internal software of the device: hence, an update of the software (even on older devices, the so-called "legacy" devices) can show all the QR codes necessary for the operators and can improve over time.

It has been found that a QR 1 version (21×21 pixels) is altogether satisfactory for the purposes considered herein. The increase in resolution of the display 102 and of the QR code may enable an increase of the amount of information displayed.

Without prejudice to the underlying principles, the details of construction and the embodiments may vary, even significantly, with respect to what has been described herein purely by way of non-limiting example, without thereby departing from the sphere of protection, as this is specified in the annexed claims.

LIST OF REFERENCE SIGNS

Lighting system 10
Lighting devices F1, F2, . . . , Fn−1, Fn
Element lit up L
Control unit CU
Base 12
Fork-like support 14
Orientation axis X14
Mobile head 16
Orientation axis X16
Light source LS
Light-projection optics 160
Longitudinal axis X10
Processing circuitry CE
Memory 100

Display 102
Navigation buttons 104
Code QR
Smartphone MP

The invention claimed is:

1. A method, comprising:
providing a lighting device wherein at least one electrically powered light generator is coupled to electrical circuitry configured to produce electrical signals to drive the at least one electrically powered light generator,
storing in the electrical circuitry an electrical marker signal of the lighting device, and
displaying the electrical marker signal in a visual display unit coupled to the electrical circuitry,
wherein the electrical marker signal is displayed on said visual display unit as a visually recognizable optical mark, and
wherein the visually recognizable optical mark is a Quick Response (QR) code.

2. The method of claim 1, wherein the electrical marker signal comprises data fields selected out of: a serial number, a unique identifier, and/or a production lot of the lighting device.

3. The method of claim 1, comprising selectively activating said visual display unit to make the optical mark visually recognizable.

4. The method of claim 1, comprising configuring the electrical circuitry to selectively activate the visual display unit independently of the at least one electrically powered light generator, wherein the visual display unit is activatable to display the optical mark irrespective of whether the at least one electrically powered light generator is active or inactive.

5. The method of claim 1, comprising updating the electrical marker signal stored in the electrical circuitry, wherein said visually recognizable optical mark is updated accordingly.

6. The method of claim 1, comprising:
wherein providing the lighting device includes providing a plurality of lighting devices, wherein each lighting device of the plurality of lighting devices comprises the at least one electrically powered light generator coupled to the electrical circuitry configured to produce the electrical signals to drive the at least one electrically powered light generator,
storing in the electrical circuitry of each lighting device of the plurality of lighting devices respective electrical marker signals of the plurality of lighting devices,
displaying the respective electrical marker signals of the plurality of lighting devices as visually recognizable optical marks on respective visual display units coupled to the electrical circuitry in the respective lighting devices of the plurality of lighting devices),
optically reading the visually recognizable optical marks displayed on the respective visual display units coupled to the electrical circuitry in the respective lighting devices (of the plurality of lighting devices, and
recognizing the respective lighting devices of the plurality of lighting devices as a function of the visually recognizable optical marks read from the respective visual display units coupled to the electrical circuitry in the respective lighting devices of the plurality of lighting devices.

7. A lighting device configured to be used in the method of claim 1, wherein the lighting device comprises the at least one electrically powered light generator as well as the electrical circuitry configured to produce the electrical signals to drive the at least one electrically powered light generator, wherein:
the electrical circuitry has stored therein the electrical marker signal of the lighting device, and
the visual display unit is coupled to the electrical circuitry wherein the visual display unit is configured to display the electrical marker signal as the visually recognizable optical mark,
wherein the visually recognizable optical mark is a Quick Release (QR) code.

8. The lighting device of claim 7, wherein the visual display unit is selectively activatable to make the optical mark visually recognizable.

9. The lighting device of claim 7, wherein the visual display unit is selectively activatable independently of the at least one electrically powered light generator, and wherein the visual display unit is activatable to display the optical mark irrespective of the electrically powered light generator being active or inactive.

10. The lighting device of claim 7, wherein:
the lighting device comprises a base and a head, which is orientable with respect to the base,
the at least one electrically powered light generator is located in said orientable head, and
the visual display unit is located in said base.

11. The lighting device of claim 8, wherein the visual display unit is coupled to a buffer battery.

* * * * *